2,850,471

WATER DISPERSIBLE POLYMER FILM COMPOSITION

Isabel M. Klein, Buffalo, N. Y., assignor to E. I. du Pont de Nemours and Company, Wilmington, Del., a corporation of Delaware No Drawing. Application April 9, 1956
Serial No. 576,802

4 Claims. (Cl. 260—31.6)

This invention relates to a new polymer composition redispersible in water and comprising mixtures of partially hydrolyzed polyvinyl acetate and a copolymer of vinyl acetate with a polymerizable organic acid.

The packaging of materials such as detergents, bleaching agents and insecticides in containers suitable for dispersion in water without the need for removing them from the package is a problem of long standing. Many film forming materials are available but none of sufficiently satisfactory quality in that they may be hygroscopic and thus not possess good shelf stabilities under varying humidity conditions; they may not form sufficiently strong films to withstand shipping and handling conditions, they may not dissolve or disperse in water rapidly and completely enough to be practical; and they may not form sufficiently stable dispersions or solutions which do not separate into non-homogeneous layers, in other words, are incompatible with other necessary components to serve as the film forming mixture or composition.

It is accordingly a major objective of this invention to provide a film composition which will disperse readily in water, have adequate film strength, have low hygroscopicity and good sealing characteristics. It is another object to provide a film forming material which can be readily deposited from an aqueous medium. A further object is an aqueous dispersion having film forming characteristics, all the components of which are compatible therein. A still further object is the preparation of a film composition suitable for making a water soluble packaging material for use in packaging individual measured quantities in predetermined amounts for use with such materials as detergents, insecticides, bleaching agents and the like.

According to the present invention these and other objectives can be accomplished by making a film composition from a mixture of a partially hydrolyzed polyvinyl acetate, a copolymer containing copolymerized vinyl acetate with about 5% by weight of a polymerizable organic acid and a suitable plasticizer. A suitable anti-blocking agent may also be necessary to prevent adhesion when separate film surfaces contact each other.

Throughout this description of the invention and in the appended claims, the term "partially hydrolyzed polyvinyl acetate" defines a polyvinyl alcohol made by hydrolyzing polyvinyl acetate to convert part of the acetate groups to hydroxyl groups.

A film suitable for making individual dosage packages for materials such as soap powders or detergents generally can be made according to this invention such that the single package containing the additive may be added to the water to be used in, e. g. dish washing and the entire package and contents will disperse readily. Such a film permits making each package of the predetermined size to contain a given constant amount of material so that the ultimate user does not have to measure out the amount to be added but simply adds a complete sealed package which then will dissolve or disperse completely in the water. This invention provides a composition which is eminently suitable for this purpose. The basic composition comprises a mixture of polyvinyl alcohol made by hydrolyzing between about 79 to 94% of the acetate groups contained by polyvinyl acetate and a copolymer essentially comprised of about 95% vinyl acetate and 5% crotonic acid, said copolymer being present at least in part as the alkali metal salt, preferably the sodium salt.

A film to have suitable pliability and other desirable physical properties will require the presence of a plasticizer which must be readily dispersible in the aqueous medium from which the film is deposited. Such plasticizers must not result in films which will quickly absorb moisture from highly humid atmospheres nor must they be absorbed by the contents of packages made from films containing them.

Since the films composed of partially hydrolyzed polyvinyl acetate and the water soluble salt of vinyl acetate crotonic acid copolymer have a tendency to adhere together, especially when in close contact and under pressure it may be highly desirable to add an anti-blocking agent to the film composition. And here also the anti-blocking agent must not impart undesirable characteristics to the resultant film such as increasing the heat sealing temperature.

For example, a suitable film composition is made by the following procedure. To 82 grams water 18 grams of "Elvalan" vinyl polymer (a commercial grade of polymer made by copolymerizing 95 parts of vinyl acetate with 5 parts of crotonic acid) is added along with 0.9 gram soda ash. The mixture is stirred at 60° C. until complete solution occurs in 20 to 30 minutes. A 12% solution of "Elvanol" 52–22 polyvinyl alcohol in water is prepared ("Elvanol" 52–22 is a commercial product made by hydrolysis or alcoholysis of polyvinyl acetate until 86 to 89% of the acetate groups have been converted to hydroxyl) by simply mixing the two. An aqueous dispersion of Resoflex R–296 (an alkyd resin plasticizer sold by Cambridge Industries Co. and made by reacting diethylene glycol and adipic acid) is prepared by stirring 1.44 grams of it with 0.1 gram of concentrated ammonia in 1 gram of water. The film casting composition containing approximately equal parts by weight of the two resins is then made by mixing 40 grams of the 18% "Elvalan" solution with 60 grams of the "Elvanol" solution, adding the 1.44 grams of Resoflex dispersed in dilute aqueous ammonia, adding 1.44 grams glycerine and stirring for 5 minutes to obtain uniform dispersion. The mixture thus obtained is cast to form films on polyethylene or chlorinated rubber surfaces. After drying, the film is separated from the surfaces and is ready for conversion into a form or container of desired size and shape. In fabricating the package overlapping edges may be heat sealed. Likewise after filling the package it is tightly sealed by applying heat at the closure. A heat between 75–200° C. may be necessary depending upon composition and its content of inorganic components.

For many purposes it will be advantageous to add an anti-blocking agent to the film composition to prevent adhesion of sheet to sheet or when the film is stored in roll form. Examples of anti-blocking agents found effective are sodium sebacate, cetyl betaine and diphenyl phthalate. Others may be found suitable and this invention is not limited to the use of any particular one. The amount of anti-blocking agent used will be about 5% by weight based on the weight of the total resin present and may vary between about 3% and 10% of the weight of the final film composition.

The copolymer resin component of the film composition consists chiefly of polymerized vinyl acetate but must contain between about 3% to 10% by weight of a copolymerized organic acid such as crotonic acid, allyloxy acetic acid and acrylic acid. The copolymer must be soluble in water or dilute alkali to make the film casting composition and must contain some nonvolatile alkali in the final film composition. The ammonium salt of the copolymer is very soluble but the ammonia is completely fugitive on casting and drying the film so that the final composition would for many uses not be as quickly soluble as desired. Accordingly, a part of the alkali used may come from the alkali metal group preferably sodium and potassium. The nonvolatile alkali should comprise between about 25% to 100% of the total alkali required to make the soluble salt solution of the copolymer, the balance, up to 75% of the alkali may be ammonia or an organic nitrogen base such as triethanolamine. The amount of the copolymer resin to be used in making the film composition may vary between about 20% and 80% of the total resin content.

The polyvinyl alcohol resin component of the film composition must be a polyvinyl acetate alcoholized or saponified to an extent between about 79 to 94%. The amount of this grade of polyvinyl alcohol or partially hydrolyzed polyvinyl acetate to be used in the film composition will vary between about 20% and 80% of the total resin content. Completely saponified polyvinyl acetate is not suitable for preparing films which are readily redispersible in water.

To function satisfactorily the resin composition must contain a plasticizer which is dispersible in water so that a fairly homogeneous casting composition can be prepared. In general a mixture of plasticizers will be better than a single one. Glycerine is good except that it is quite hygroscopic and is therefore best used in combination with such agents as Resoflex R–296 and Resoflex R–446 which are alkyd resins derived from the reaction between diethylene glycol and adipic acid. R–296 retains some unreacted adipic acid and the end groups of the alkyd resin are carboxyl groups. R–446 is similar to R–296 except that it is cross-linked as a result of a longer heating cycle during preparation. Other plasticizers can be used such as triacetin, polyglycerol, dibutyl phthalate, diphenyl phthalate, Standapon (an alkylated aryl polyether alcohol), and mixtures of any two or more of them or other agents not listed. The amount of plasticizer in the final film will vary between about 10 to 30% of the total composition.

I claim:

1. A water dispersible film composition comprising a resinous composition and from about 10% to 30% by weight based on said resinous composition of at least one plasticizer selected from the group consisting of glycerine, polyglycerol, triacetin, dibutyl phthalate, diphenyl phthalate, and polyesters having carboxyl end groups, said polyesters being prepared by condensation polymerization of diethylene glycol with adipic acid, said resinous composition comprising from 20% to 80% by weight of a partially hydrolyzed polyvinyl acetate having from 79% to 94% of the acetate groups converted to hydroxyl groups, and from 20% to 80% by weight of a copolymer of about 95% vinyl acetate and about 5% of an acid selected from the group consisting of crotonic acid, allyloxy acetic acid and acrylic acid, said copolymer having from 25% to 100% of its carboxyl groups present as the salt of an alkali metal selected from the group consisting of sodium and potassium.

2. A water dispersible film composition comprising a resinous composition and from about 10% to 30% by weight based on said resinous composition of at least one plasticizer selected from the group consisting of glycerine, polyglycerol, triacetin, dibutyl phthalate, diphenyl phthalate, and polyesters having carboxyl end groups, said polyesters being prepared by condensation polymerization of diethylene glycol with adipic acid, said resinous composition comprising from 20% to 80% by weight of a partially hydrolyzed polyvinyl acetate having from 79% to 94% of the acetate groups converted to hydroxyl groups, and from 20% to 80% by weight of a copolymer of about 95% vinyl acetate and about 5% crotonic acid, said copolymer having from 25% to 100% of its carboxyl groups present as the salt of an alkali metal selected from the group consisting of sodium and potassium.

3. The water dispersible film composition of claim 2 which contains from 3% to 10% by weight based on said composition of an anti-blocking agent selected from the group consisting of sodium sebacate, cetyl betaine and diphenyl phthalate.

4. A water dispersible film composition comprising 5 parts by weight of the sodium salt of a copolymer of about 95% vinyl acetate and about 5% crotonic acid, 5 parts by weight of a partially hydrolyzed polyvinyl acetate having 86% to 89% of the acetate groups converted to hydroxyl groups, 1 part by weight of glycerine, and 1 part by weight of a polyester having carboxyl end groups, said polyester being prepared by condensation polymerization of diethylene glycol with adipic acid.

References Cited in the file of this patent

UNITED STATES PATENTS

| | | |
|---|---|---|
| 2,317,725 | Billig | Apr. 27, 1943 |
| 2,657,187 | Evans et al. | Oct. 27, 1953 |